March 10, 1931. J. G. HARPER 1,795,558
CHASER HOLDER
Filed May 13, 1927
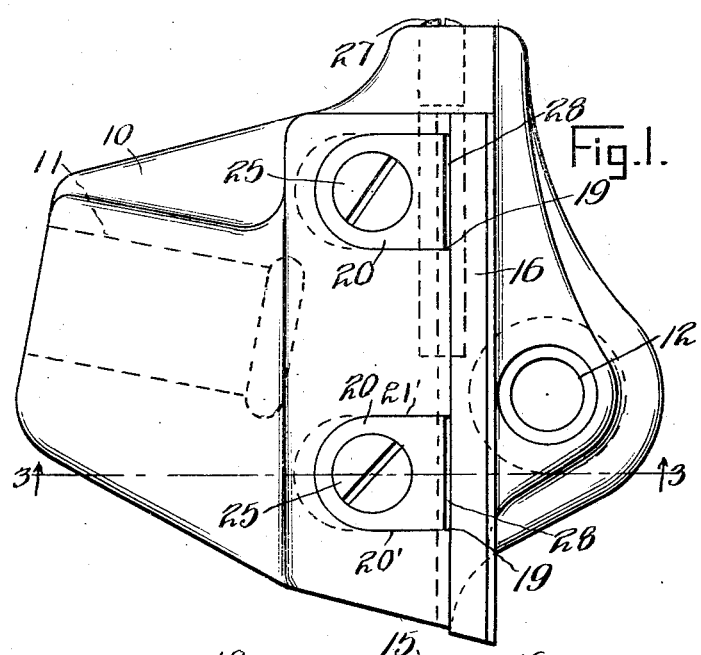
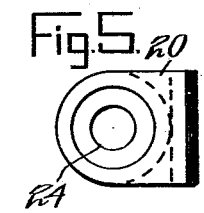
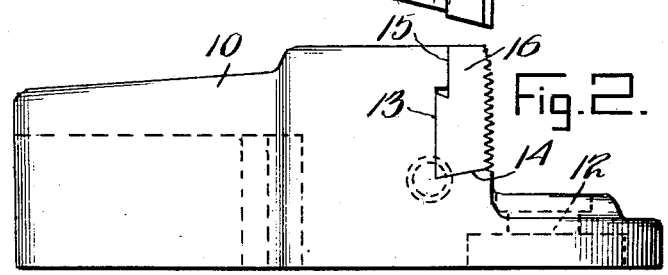
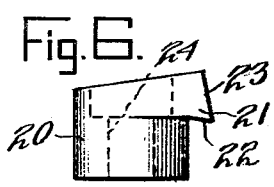
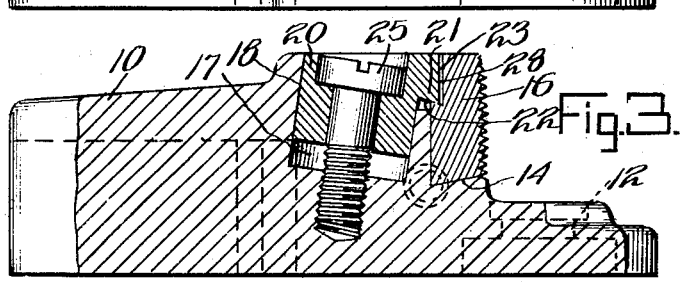
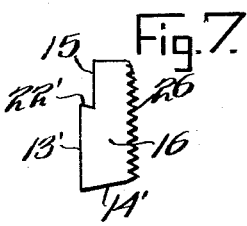
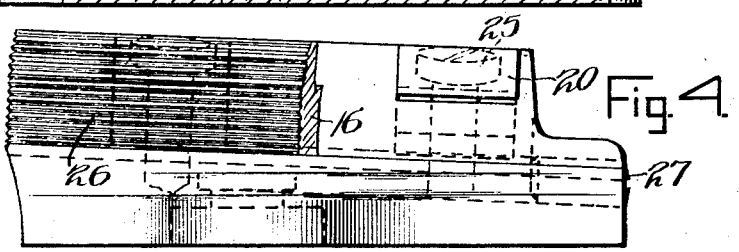
Inventor
James G. Harper Patented Mar. 10, 1931

1,795,558

UNITED STATES PATENT OFFICE

JAMES G. HARPER, OF WAYNESBORO, PENNSYLVANIA, ASSIGNOR TO LANDIS MACHINE COMPANY, OF WAYNESBORO, PENNSYLVANIA, A CORPORATION

CHASER HOLDER

Application filed May 13, 1927. Serial No. 191,246.

The object of my invention is to provide a chaser holding mechanism for clamping chasers or thread cutters on a die head. The object of the invention is to secure a chaser clamp that will hold the chasers or thread cutters securely seated against predetermined surfaces in the holding block. The object sought to be accomplished by this invention is to secure a chaser holding device of such character that the position of the chaser will not be influenced by the clamping members or clamping member screws while these are being tightened in the holder block.

Further objects and advantages of the invention will become apparent as the description of the invention proceeds.

In the accompanying drawings, which are made a part hereof and on which similar reference characters indicate similar parts, Figure 1 is a plan view of the chaser mounted in its holder, Figure 2, a side elevation, Figure 3, a sectional view through the clamping member at 3—3 of Figure 1, Figure 4, a front elevation of Figure 1 with a part of the cutter or chaser removed, Figures 5 and 6 are plan and side views respectively of the clamping members, and Figure 7, a side elevation of the tangential type chaser, In the drawings, reference character 10 indicates a holder of conventional construction having an aperture 11 in its lower portion and a hole 12 for the reception respectively of a securing element on a die head and a bolt or screw for fastening the block upon the die head. The front portion of the holder block is provided with a plane face 13 having an offset plane face 15 parallel thereto and a beveled seat 14 for the reception of a chaser or cutter 16. The holding block is provided also with chambers 17 having side walls 18 cut obliquely with respect to the face 15. The offset plane face 13 adjacent the chamber 18 is also cut away at 19 for the reception of holding or clamping blocks 20. The clamp 20 has a depending overhanging lip 21 adapted to grip a suitable portion of the chaser. The said lip is provided with a beveled under-surface 22 and a beveled edge 23. The clamp 20 is further provided with a bore 24 for the reception of a screw 25 by means of which it is secured upon the holder block 10. The chaser or cutter is provided with longitudinal serrations or cutting grooves 26 upon its face and has a lower beveled portion 14' and a rear plane face 13' and an offset face 15' cut parallel to the plane of the face 13'. A beveled portion 22' provides a shoulder for receiving the beveled edge 22 of the gripping portion 21 of the clamp or holder 20. A suitable abutting screw 27 threaded in the block 10 provides means for adjusting the chaser or cutter longitudinally of the block 10.

In the carrying out of my invention, the novel features and advantages will best appear. The chaser 16 is inserted in the front face of the holder 10 so that the beveled portion 14' of the chaser rests upon the corresponding beveled edge or recess 14 of the holder 10, the faces 15' and 13' of the chaser fitting against faces 15 and 13 of the holder block respectively. The clamp 20 is then inserted in the recess 17 in the holder 10 and is secured therein by means of the screw or bolt 25. The gripping edge 22 of the clamp engages the beveled edge 22' of the chaser to secure the chaser tightly in position, being held or gripped in a somewhat dove-tailed manner. It will be observed from the construction shown in Fig. 3 that the clamp 20 is set obliquely in the block 10. As it is screwed down into clamping engagement by the holding screw 25, the beveled edge 22 of the clamping member engaging the corresponding bevel 22' on the chaser will seat the chaser firmly upon its seat 14 and at the same time draw it tightly against the faces 13 and 15 of the holder block with a wedging action.

It will be observed from an inspection of Figs. 1 and 3 that a slight clearance 28 is provided between the face 23 of the clamp member 20 and face 15' of the chaser. This clearance prevents the chaser from abutting an edge of the clamp before it shall have been firmly seated in the proper recess in the holder block 10. The clamp 20 is made to fit the edges 20' and 21' in the chamber 17 with very great accuracy. This is done to prevent the clamp from turning in its socket. A very slight turning would decrease the clearance 28 and might force the chaser away from the faces 13 and 15. This must be avoided.

It will be apparent that the position of the chaser is determined by the surfaces 15, 13 and the seat 14 on the holding block, all of which surfaces may be predetermined with very great accuracy.

It will be obvious to those skilled in the art that various changes may be made in my device without departing from the spirit of my invention, and I, therefore, do not limit myself to what is shown in the drawings and described in the specification, but only as set forth in the appended claims.

Having thus fully described my invention, what I claim as new and desire to secure by Letters Patent is:

1. A chaser holder comprising a block having a beveled seat adapted to receive a chaser and having a plane face and an offset parallel plane portion against which a portion of the back of the chaser seats, the said block having a recess obliquely cut therein, and a chaser clamp seated in said recess the said clamp having a gripping portion extending forward slightly less than the offset plane of the holder, substantially as set forth.

2. A chaser having a longitudinal grooved face for forming screw threads and beveled along one side adjacent to the grooved face and having a portion of its back cut away to form a clamping rib, a holder having a beveled seat and a plane face and an off-set parallel plane portion the said last-named plane serving to receive a portion of the back of the chaser when the latter is in cutting position, said chaser being mounted in the holder, said holder having clamps obliquely mounted therein, the said clamps having gripping portions adapted to engage a rib on the chaser and to contact with the chaser on this rib only, substantially as set forth.

3. A chaser holder having a beveled seat, off-set parallel surfaces adjacent to the beveled seat, said beveled seat and off-set parallel surfaces adapted to position a thread cutting chaser having a beveled face, parallel thread cutting serrations on its front face, and a portion of its back cut away to form a clamping surface, clamps secured to said holder in gripping contact with said chaser to hold the chaser against said offset parallel surfaces, substantially as set forth.

4. Supporting means for a trapezoidal tangential chaser having grooves on its face for forming screw-threads comprising a holder, clamps having overhanging edges adapted to engage the chaser said holder having a beveled surface to receive a beveled base on a chaser and having off-set parallel surfaces to receive off-set parallel planes on the back of a chaser, the clamps being positioned obliquely relative to the off-set parallel surfaces on the holder, and having a lip adapted to engage a beveled rib on the chaser for clamping the chaser in thread-cutting position, substantially as set forth.

5. A chaser holder comprising a block having a beveled seat for a chaser, off-set parallel plane faces adapted to engage corresponding faces on a chaser, a recess obliquely cut into said holder, a clamp in said recess, a gripping portion on the front side of said clamp extending over a beveled shoulder on said chaser but extending a distance less than that between the off-set parallel plane faces on the rear of the chaser, substantially as set forth.

In witness whereof, I have hereunto set my hand at Waynesboro, Pennsylvania this ninth day of May, A. D. nineteen hundred and twenty-seven.

JAMES G. HARPER.